United States Patent
Inada et al.

[11] 3,877,756
[45] Apr. 15, 1975

[54] ANTI-SKID BRAKE CONTROL SYSTEM
[75] Inventors: Masami Inada; Toshiyuki Kondo, both of Toyoake, Japan
[73] Assignee: Aisin Seiki Kabushiki Kaisha, Kariya, Aichi pref., Japan
[22] Filed: July 26, 1973
[21] Appl. No.: 382,949

[30] Foreign Application Priority Data
July 31, 1972 Japan................................ 47-76740

[52] U.S. Cl............................................ 303/21 F
[51] Int. Cl............................................. B60t 8/10
[58] Field of Search.................................. 303/21 F

[56] References Cited
UNITED STATES PATENTS
| | | | |
|---|---|---|---|
| 3,659,905 | 5/1972 | Goulish | 303/21 F |
| 3,690,737 | 9/1972 | Neese et al. | 303/21 F |
| 3,738,712 | 6/1973 | Flory | 303/21 F |

Primary Examiner—Trygve M. Blix
Assistant Examiner—Barry L. Kelmachter
Attorney, Agent, or Firm—Oblon, Fisher, Spivak, McClelland & Maier

[57] ABSTRACT

An anti-skid brake control system includes a power booster interposed between a master cylinder and a brake pedal, and first and second solenoid valves electrically connected to a computer which generates first and second signals therefrom in response to wheel locking conditions, the second signal of which may be generated a predetermined time after the first signal is terminated whereby the first solenoid valve serves to reduce the hydraulic pressure within the booster upon reception of the first signal from the computer so as to release the brake pressure to the wheels and the second solenoid valve serves to gradually increase the reduced pressure within the booster upon reception of the second signal from the computer so as to recover the brake pressure whereby a substantially ideal anti-skid braking operation can be performed.

5 Claims, 5 Drawing Figures

ANTI-SKID BRAKE CONTROL SYSTEM

BACKGROUND OF THE INVENTION

1. Field of the Invention

The present invention relates generally to anti-skid brake control systems, and more particularly to an anti-skid brake control system which includes a power booster for a wheeled vehicle.

2. Description of the Prior Art

In conventional anti-skid brake control systems, the skid preventing action has usually been carried into effect in such a manner that the reduction and increase in the hydraulic brake pressure are cyclical wherein the duration of one cycle is an extremely short period of time, such relationship between the brake pressure and time being shown, for example, in FIG. 3.

Significant drawbacks encountered in this system, however, are such that the rapid fluctuation in the hydraulic brake pressure may impart an unpleasant feeling to the driver of the vehicle, and in addition, both the braking distance and period may be unduly extended due to the considerable ineffective braking energy dissipation.

On the other hand, it is well known that highly effective brake operation may be realized when the adhesive coefficient $\mu$ present between the vehicle tires and the road surface is substantially at a maximum value which corresponds to a specific slip ratio range of approximately 0.15–0.2, such relationship therebetween being shown for example, in FIG. 2.

SUMMARY OF THE INVENTION

Accordingly, it is an object of the present invention to provide an improved anti-skid brake control system which is capable of obviating the aforementioned conventional drawbacks.

Another object of the present invention is to provide an improved anti-skid brake control system which is highly reliable and yet relatively simple, and inexpensive to manufacture.

A further object of the present invention is to provide an improved anti-skid brake control system wherein the adhesive coefficient $\mu$ is taken into account in such manner that the effective application of the brake pressure occurs within the maximized range of the adhesive coefficient $\mu$ which substantially corresponds to the slip ratio range of approximately 0.15–0.2.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF A PREFERRED EMBODIMENT

Figure 1:
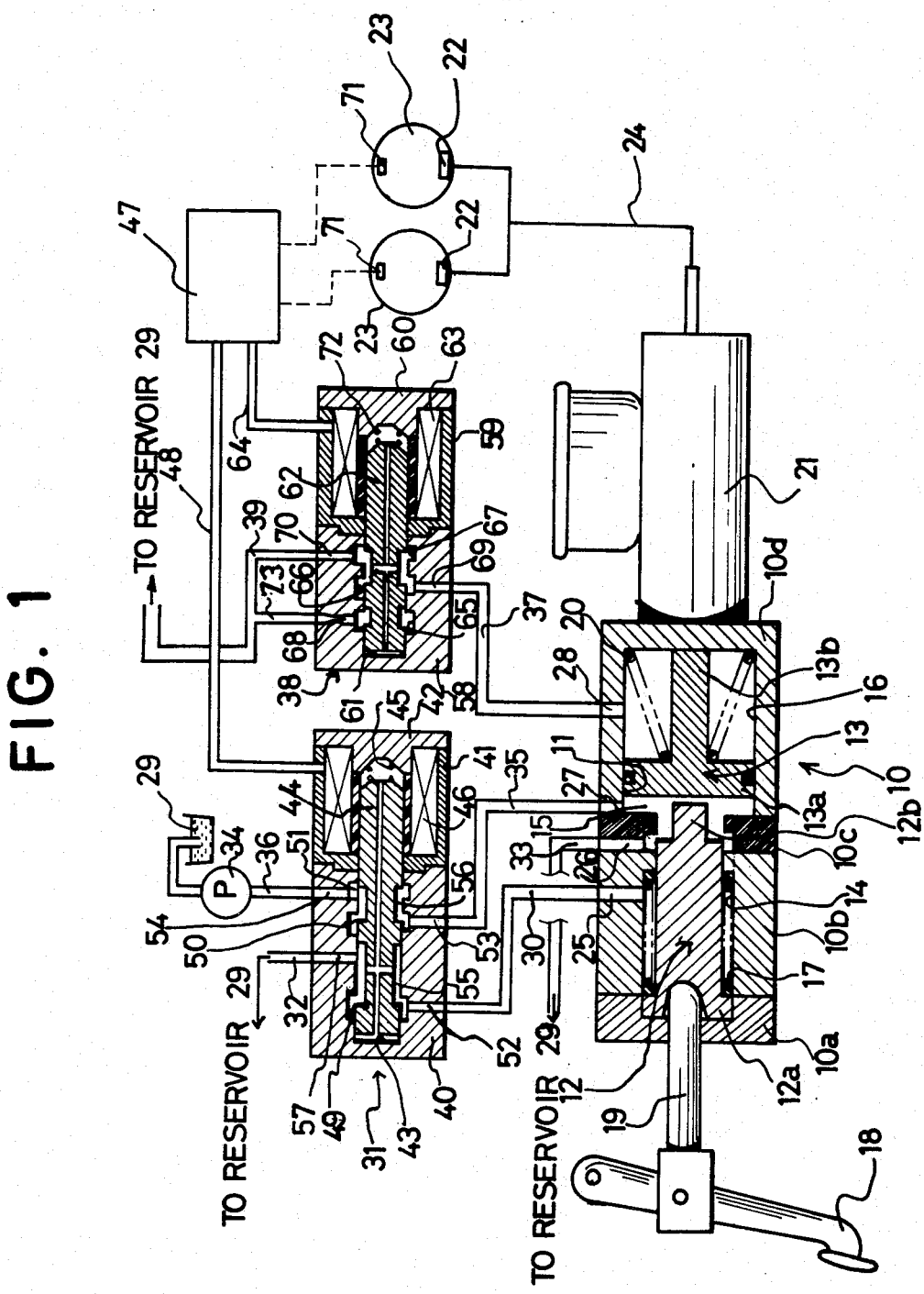
FIG. 1 is a schematic view of an anti-skid brake control system constructed according to this invention and showing its cooperative parts, some of which are shown in cross-section.
Figure 2:
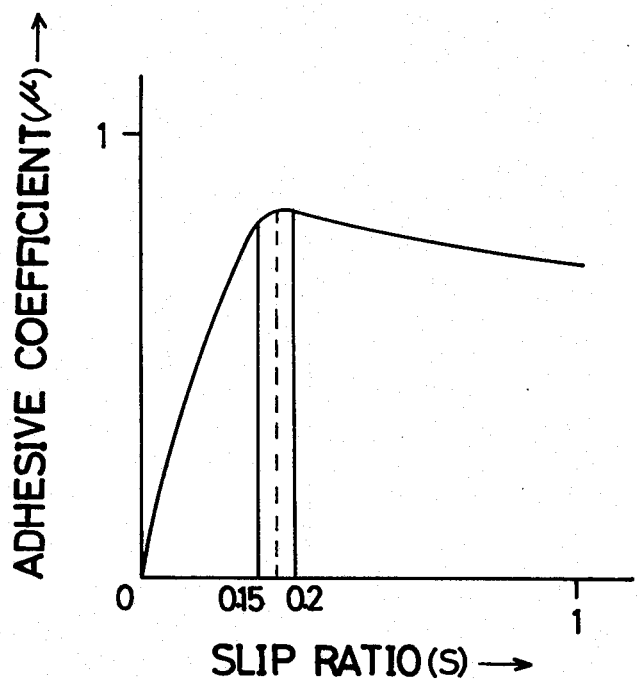
FIG. 2 is a graph showing the relationship between the adhesive coefficient and the slip ratio, and particularly disclosing the fact that the maximum value of the adhesive coefficient substantially corresponds to a specific value of the slip ratio within the range of approximately 0.15-0.2.
Figure 3:
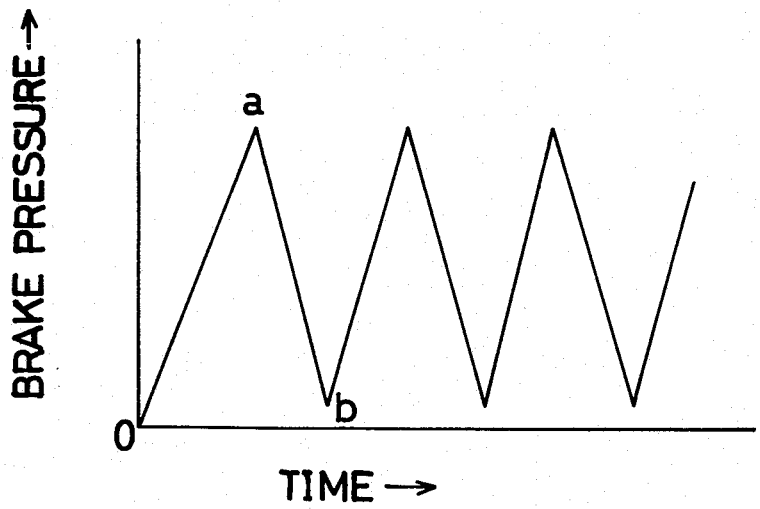
FIG. 3 is a graph showing the variation in the brake pressure as a function of time according to prior art techniques.

Referring now to the drawings, and more particularly to FIG. 1 thereof, a power booster housing generally indicated by the numeral 10 includes four housing segments 10a, 10b, 10c and 10d which are serially aligned from left to right as seen in FIGURE 1 each of the segments being securely connected to each adjacent segment by means of a plurality of bolt-nut assemblies, not shown. A stepped bore 11 is provided within the housing 10, and a stepped valve piston 12 and a stepped power piston 13 are slidably and sealingly disposed within the stepped bore 11 so as to divide the same into three chambers 14, 15 and 16. A spring 17 annularly surrounds the main body portion of piston 12 and is interposed between the large diameter portion 12a of the valve piston 12 and the housing part 10b within the chamber 14 so as to normally bias the valve piston 12 in the leftward direction as seen in the figure, the large diameter portion 12a being operatively connected with a brake pedal 18 via a connecting rod 19. Another spring 20 is similarly interposed between the large diameter portion 13a of the power piston 13 and the housing segment 10d within the chamber 16, and the right end surface of the small diameter portion 13b of the power piston 13 is operatively connected with a piston, not shown, of a master cylinder 21 which is in communication with the wheel brake cylinders 22 of vehicle wheels 23 via a conduit 24. The right end portion 12b of the valve piston 12 projects into chamber 15 so as to be engageable with the left end surface of the large diameter portion 13a of the power piston 13, but is normally separated therefrom as is shown in FIG. 1.

Housing 10 is also provided with four radial hydraulic passages 25, 26, 27 and 28, passage 25 being formed within the housing part 10b so as to provide communication between chamber 14 and a reservoir 29 through means of a conduit 30, a first electro-magnetic valve generally indicated by the reference character 31, and a conduit 32, and passage 26 being formed within the housing part 10c so as to provide communication between chamber 15 and the reservoir 29 via another conduit 33. Passage 27 is similarly formed within the housing part 10c so as to provide communication between chamber 15 and a pump 34 via means of a conduit 35, the first electro-magnetic valve 31, and another conduit 36, and passage 28 is formed within the housing part 10d so as to provide communication between the chamber 16 and the reservoir 29 via means of a conduit 37, a second electro-magnetic valve, generally indicated by the reference character 38, and a conduit 39.

The first electro-magnetic valve 31 is provided with first, second and third housings 40, 41 and 42, each of the housings being securely connected to each adjacent housing by means of a plurality of bolt-nut assemblies not shown. Within the valve 31 is also provided a bore 43 in which a plunger valve 44 is slidably disposed, a spring 45 being interposed between the right end surface of the plunger valve 44 and the third housing 42 so as to normally bias the valve 44 toward the left as seen in the drawing, and a first solenoid coil 46, disposed within the second housing 41, is electrically connected with a computer 47 via a conductor 48. The bore 43 of the first electro-magnetic valve 31 is further provided with three axially spaced, annular grooves 49, 50, and 51 which respectively communicate with the conduits 30, 35 and 36 via radial passages 52, 53, 54 provided within the first housing 40, and the plunger valve 44 is similarly provided with two axially spaced annular grooves 55 and 56. Groove 55 of plunger valve 44 is in communication with the chamber 14 of the power booster housing 10 via annular groove 49, passage 52, and conduit 30, and is also in communication with the reservoir 29 via means of another radial passage 57 provided within housing 40, and the conduit 32, while groove 56 of the plunger valve 44 is similarly in communication with chamber 15 of the power booster housing 10 via annular groove 50, passage 53, and conduit 35, and is also in communication with pump 34 via means of annular groove 51, passage 54, and conduit 36.

Similarly, the second electro-magnetic valve 38 is provided with first, second and third housings 58, 59 and 60 each of which are securely connected to the adjacent housings by means of a plurality of bolt-nut assemblies, not shown. Within the second electromagnetic valve 38 there is provided a bore 61 in which a plunger valve 62 is slidably disposed, a spring 72 being interposed between the right end surface of the plunger valve 62 and the third housing 60 so as to normally bias the valve 62 toward the left as seen in the drawing, and a second solenoid coil 63, disposed within the second housing 41, is electrically connected with the computer 47 via means of a conductor 64. The bore 61 of the second electo-magnetic valve 38 is provided with three annular grooves 65, 66 and 67, wherein the annular groove 65 is in communication with the reservoir 29 via a radial orifice passage 68 provided within the first housing 58 and a conduit 73, which is also connected with the conduit 39, the annular groove 66 is in communication with chamber 16 of the power booster housing 10 via means of a radial passage 69 within housing 58 and conduit 37, and the annular groove 67 is in communication with the reservoir 29 via means of a radial passage 70 provided within the first housing 58 and the conduit 39. The computer 47 is electrically connected to sensors 71 which are respectively attached to the wheels 23 of the vehicle.

Figure 5:
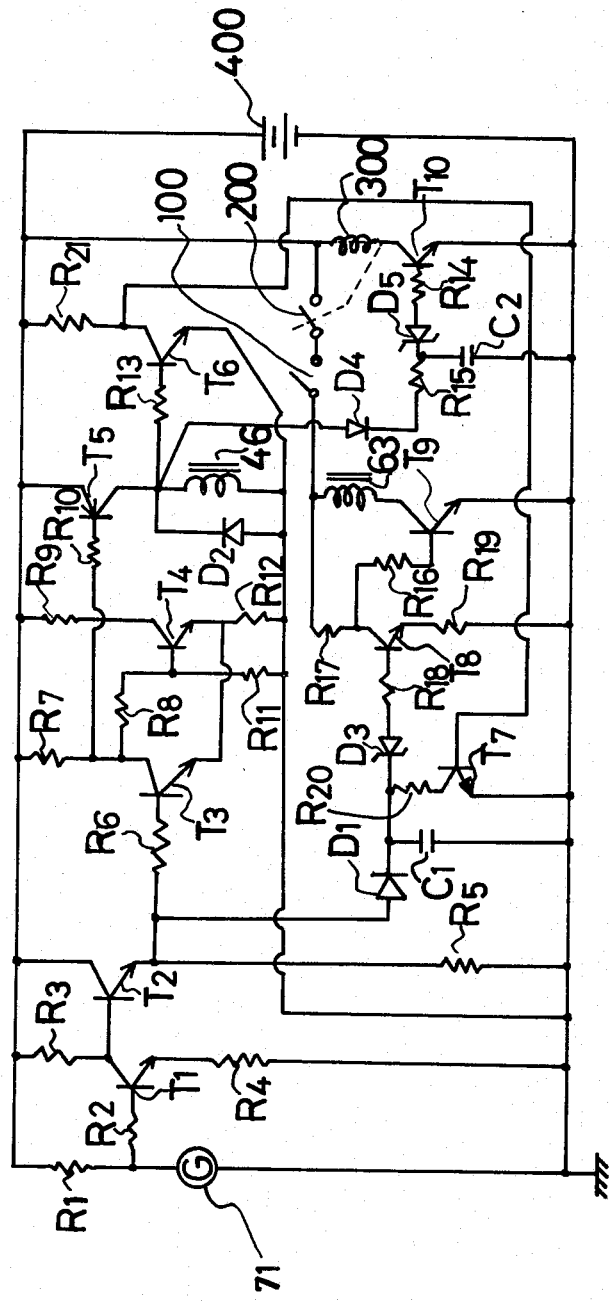

Referring now to FIG. 5, each of the sensors or generators 71 develops a voltage output in proportion to the wheel angular deceleration and acceleration of the wheels 23, and is connected to a battery 400 through means of a resistor $R_1$, and is also connected to a transistor $T_1$ through means of a resistor $R_2$. The collector of the transistor $T_1$ is connected to the battery 400 through means of a resistor $R_3$ and is directly connected to another transistor $T_2$, while the emitter of the transistor $T_1$ is grounded through means of a resistor $R_4$. The collector of the transistor $T_2$ is also connected to the battery 400, while the emitter is grounded through means of a resistor $R_5$, is also connected to a diode $D_1$, and is further connected to another transistor $T_3$ through means of another resistor $R_6$. The collector of the transistor $T_3$ is likewise connected to the battery 400 through means of a resistor $R_7$, and is further connected to the base of a transistor $T_4$ through means of a resistor $T_8$ and the base of a transistor $T_5$ through means of a resistor $R_{10}$, the emitters of the transistors $T_3$ and $T_4$ being commonly grounded through means of a resistor $R_{12}$. The collector of the transistor $T_4$ is connected to the battery 400 through means of a resistor $R_9$ and the collector of the transistor $T_3$ is connected, through means of the resistor $R_8$, to a resistor $R_{11}$, whereupon the same is grounded.

The transistors $T_3$ and $T_4$ function as a Schmitt trigger, and therefore, when the emitter voltage of the transistor $T_2$ is less than a predetermined value which is defined by the resistors $R_7$, $R_8$, $R_9$, $R_{11}$ and $R_{12}$, then the transistor $T_3$ is de-energized while the other transistor $T_4$ is energized. When the emitter voltage of the transistor $T_2$ becomes greater than the predetermined value, the transistor $T_3$ is energized and the transistor $T_4$ de-energized. The emitter of the transistor $T_5$ is similarly connected to the battery 400 and the collector is connected to another diode $D_2$, a first solenoid coil 46, still another diode $D_4$, and through means of a resistor $R_{13}$ to the base of a transistor $T_6$, the diode $D_2$, first solenoid coil 46 and the emitter of the transistor $T_6$ being commonly grounded. The collector of the transistor $T_6$ is in turn connected to the battery 400 through means of resistor $R_{21}$ and is also connected to the base of a transistor $T_7$.

The voltage provided at the cathode side of the diode $D_1$ is variable in accordance with that of the emitter of the transistor $T_2$ in the instance when the emitter voltage is less than the predetermined voltage value. Diode $D_1$ is further connected to a condenser $C_1$ and, through means of a resistor $R_{20}$, to the collector of the transistor $T_7$, and is also connected to a Zener diode $D_3$ which, in turn, is connected through means of a resistor $R_{18}$ to the base of a transistor $T_8$. The emitter of transistor $T_8$ is grounded through means of a resistor $R_{19}$, while the collector is connected to the second solenoid coil 63 and the base of a transistor $T_9$ through means of resistors $R_{17}$ and $R_{16}$ respectively, the collector of the transistor $T_9$ also being connected to the solenoid coil 63. A switch 100, operatively connected to the brake pedal 18, is also connected to a relay comprising a relay switch 200 and a relay coil 300, and the diode $D_4$, which is connected to the collector of the transistor $T_5$, is also connected to a Zener diode $D_5$ and a condenser $C_2$ through means of a resistor $T_{15}$, diode $D_5$ being further connected to the base of a transistor $T_{10}$ through means of a resistor $R_{14}$, it being noted that transistor $T_{10}$ is also connected to relay coil 300.

When a wheel angular deceleration occurs, the base voltage of the transistor $T_1$ is lowered in proportion thereto due to the operation of the generator 71 and accordingly the emitter voltage of the transistor $T_2$ is raised. When this raised voltage is greater than the predetermined value, the transistor $T_3$ of the Schmitt trigger is conductive and accordingly the transistor $T_5$ becomes conductive whereby the first solenoid coil 46 is energized so as to reduce the brake pressure. The transistor $T_7$ is at this time de-energized due to the energization of the transistor $T_6$ and the condenser $C_1$ is charged with the maximum voltage of the emitter of transistor $T_2$ which is generated through means of the transistor $T_1$. When the voltage charged at the condenser $C_2$ becomes a predetermined value, which is the capacity voltage of the Zener diode $D_5$, the transistor $T_{10}$ becomes conductive, and therefore the relay switch 200 is closed due to the energization of the relay coil 300. Under these conditions, however, as the charged voltage at the condenser $C_1$ is greater than the Zener voltage of the Zener diode $D_3$, the transistor $T_8$ is conductive and the transistor $T_9$ is non-conductive, and accordingly the second solenoid coil 63 is not energized even when the relay switch 200 is closed.

The energization of the first solenoid coil 46 is terminated due to the decrease in the voltage of the transistor $T_1$. Subsequently, the emitter voltage of the transistor $T_2$ is lowered to a value less than the predetermined value due to the well-known hystersis of the Schmitt trigger. Therefore, the transistor $T_7$ is now energized and the charged voltage at the condenser $C_1$ is able to be discharged. When the voltage of the condenser $C_1$ is less than the Zener voltage of the Zener diode $D_3$, then the transistor $T_8$ is de-energized and the transistor $T_9$ is energized so as to in turn energize the second solenoid coil 63. An interval between the de-energization of the first solenoid coil 46 and the energization of the second solenoid coil 63 is to be defined in proportion to the maximum voltage charged at the condenser $C_1$.

In operation, if the driver of the vehicle exerts pressure upon the brake pedal 18, the valve piston 12 is moved toward the right as seen in FIG. 1 against the biasing force of the spring 17 and the passage 26, which serves to provide communication between the chamber 15 and the reservoir 29, is throttled, and accordingly, the hydraulic pressure within the chamber 15 is increased whereupon the power piston 13 is moved toward the right against the biasing force of the spring 20 due to the pressure differential between the chambers 15 and 16. Thus the piston, not shown, of the master cylinder 21 is actuated and the brake pressure generated therein is transmitted to the wheel brake cylinders 22 so as to apply the brakes to the wheels 23 in a normal braking operation.

Assuming now that a skid condition occurs at one of the wheels 23 during such normal braking operation, then one of the sensors 71 senses such condition and in responsee thereto the compupter 47 energizes the first solenoid coil 46 in the manner described heretofore. The plunger valve 44 then moves toward the right as seen in FIG. 1 against the biasing force of the spring 45 and this rightward movement of the plunger valve 44 alters the hydraulic communication between the three grooves 49, 50 and 51 of the valve bore 43. Whereas previously the second and third grooves 50 and 51 permitted the chamber 15 of the booster housing 10 to communicate with the pump 34, chamber 15 is now in communication with the reservoir 29 through means of grooves 50 and 55 and conduit 32.

At the same time, the first groove 49 which was previously permitting communication between the chamber 14 of the booster housing 10 and the reservoir 29 is now blocked by means of the plunger valve 44, and therefore the chamber 14 is hydraulically locked whereby the hydraulic fluid remains therein and consequently, the valve piston 12, together with the brake pedal 18, is prevented from further movement toward the right as seen in FIG. 1. The hydraulic pressure within the chamber 15 of the power booster 10 is also decreased due to the closing of the conduits between the hydraulic pump 34 and the chamber 15 and accordingly the power piston 13 is now able to move back under the influence of the biasing force of spring 20, whereupon the brake pressure within the master cylinder 21 is reduced so as to increase the brkaes of wheels 23.

Figure 4:
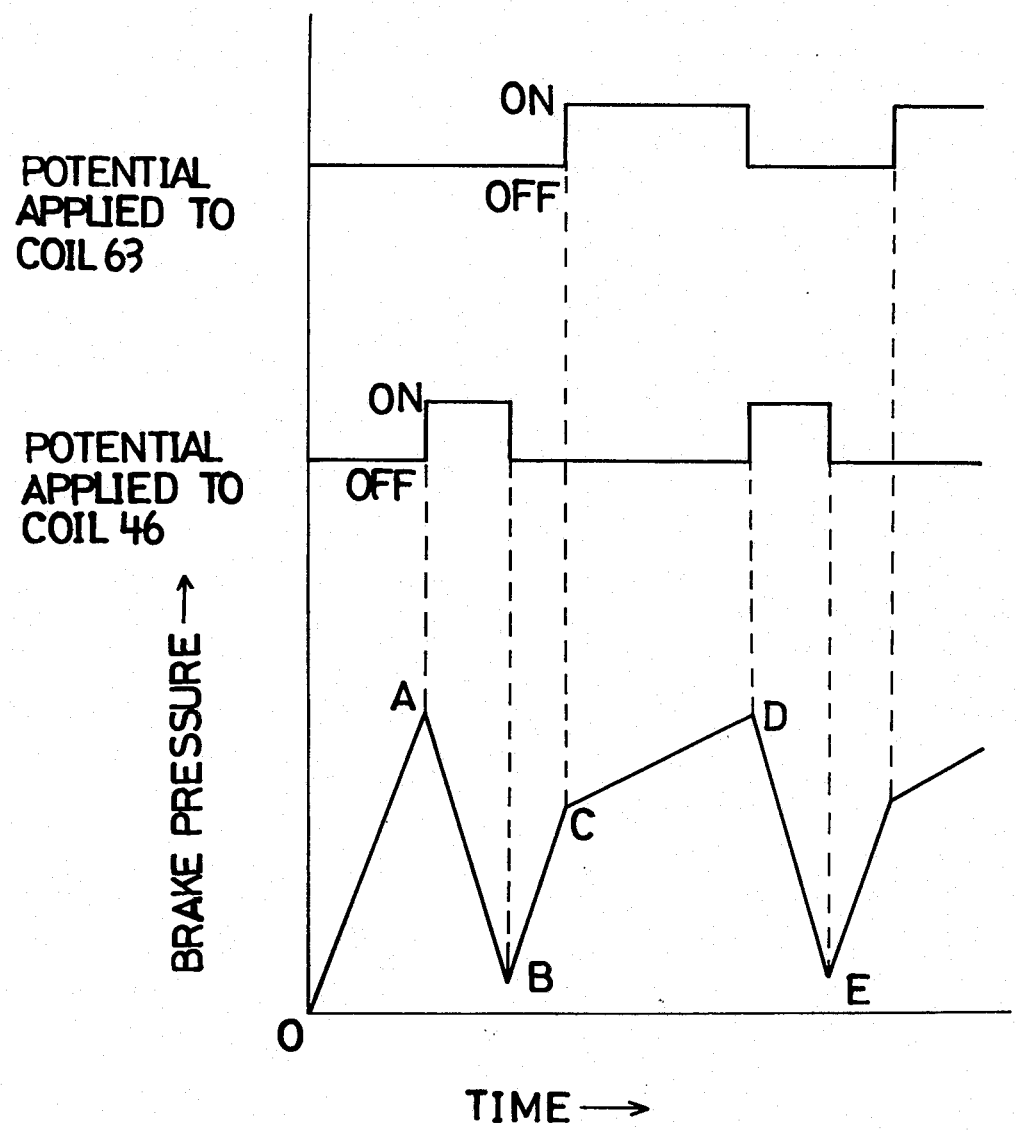
FIG. 4 is a graph similar to that of FIG. 3, showing however the variation in the brake pressure as a function of time in accordance with the ON-OFF command signals of the first and second solenoid coils within the system of the present invention; and, FIG. 5 is a circuit diagram showing the electronic system of the present invention.

In order to effectively apply the brakes under such anti-skid conditions, then, the brake pressure thus reduced to the point B should intially be rapidly increased to the point C such that the value of the adhesive coefficient $\mu$ becomes maximized, i.e., within the slip ratio range of approximately 0.15–0.2 and thereafter gradually increased, such variation in brake pressure, as a function of time, being shown in FIG. 4. The point C in FIG. 4 is defined by the maximum wheel angular deceleration generated between the initial braking perod O-A-B as seen in FIG. 4. As the brake pressure in the master cylinder 21 is reduced to the point B as seen in FIG. 4, the first solenoid coil 46 is de-energized and the plunger valve 44 is moved back toward the left as seen in FIG. 1, whereby the chamber 15 of the booster housing 10 is once again in communication with the pump 34. Therefore, due to the pressure differential between the chambers 15 and 16, the power piston 13 is again moved back toward the right against the biasing force of the spring 20 and thus the brake pressure is rapidly increased until the second solenoid coil 63 of the second electromagnetic valve 38 is energized.

When the second solenoid coil 63 is energized at a predetermined time after the first solenoid coil 46 is de-energized in the manner described heretofore, the plunger valve 62 of the second electro magnetic valve 38 is moved toward the right as seen in FIG. 1, whereupon fluid communication between the grooves 66 and 67 of the bore 61 is interrupted and communication between the grooves 66 and 65 is established. Consequently, the fluid within the chamber 16 of the booster housing 10 which has previously been permitted to flow into the reservoir via the conduit 37, the passage 69, grooves 66 and 67, the passage 70 and the conduit 39, will now flow into the reservoir via the conduit 37, the passage 69, grooves 66 and 65, the orifice passage 68 and the conduit 39. As a result, the exhaust flow into the reservoir 29 will now be at a rate slower than that prior to the movement of valve 62 due to the flow resistance of the orifice passage 68, and thus, the brake pressure will be gradually increased to the extent of wheel lock or an impending wheel lock condition, as shown at point D in FIG. 4, whereupon the second solenoid coil 63 is de-energized and the first solenoid coil 46 is energized so as to reduce the brake pressure to the point E as seen in FIG. 4. The repetition of the B-C-D-E cycle thus results in the effective application of the brakes in an anti-skid braking operation.

In the instance that there is no hydraulic pressure within the chamber 15 due to leakage within the pressure source or the like, then the valve piston 12 is moved toward the right against the biasing force of the spring 17 in proportion to the force impressed upon the brake pedal 18 so as to contact the right end wall of the large diameter portion 13 a of the power piston and may be further moved toward the right in unison therewith against the biasing force of the spring 20 so as to actuate the master cylinder in order to increase the brake pressure therein. Thus, should the hydraulic pressure fail, the vehicle can still be braked by this manual operation. Furthermore, by connecting the chamber 16 of the power booster housing 10 with the second electromagnetic valve, the influence of the pressure changes upon the driver's foot during the anti-skid braking operation may be minimized.

Obviously, many modifications and variations of the present invention are possible in light of the above teachings. It is to be understood therefore, that within the scope of the appended claims the present invention may be practiced otherwise than as specifically described herein.

What is claimed as new and desired to be secured by letters patent of the United States is:

1. An anti-skid brake control system comprising:
   wheel means including wheel brake cylinders;
   a master cylinder hydraulically connected to said wheel brake cylinders;
   manually operable means operably connected to said master cylinder;
   a booster interposed between said manually operatable means and said master cylinder including a housing and piston means slidably disposed therewithin and defining first and second chambers therein for increasing the brake pressure in said master cylinder in accordance with the pressure difference between said first and second chambers;
   hydraulic pressure source means for supplying pressure to said first chamber of said booster;
   a reservoir hydraulically connected to said pressure source;
   computer means for generating first and second signals therefrom in response to predetermined wheel rotational conditions; and
   first and second electro-magnetic valve means electrically connected to said computer means;
   wherein said first electro-magnetic valve means is hydraulically interposed between said first chamber of said booster and said hydraulic pressure source so as to reduce the hydraulic pressure within said first chamber of said booster upon reception of said first signal from said computer means thereby decreasing the brake pressure in said master cylinder, and said second electro-magnetic means is hydraulically interposed independently of said pressure source between said second chamber of said booster and said reservoir so as to gradually decrease the hydraulic pressure within said second chamber of said booster upon reception of said second signal from said computer means at a predetermined time after said first signal has been terminated thereby gradually increasing the decreased brake pressure in said master cylinder.

2. An anti-skid brake control system as set forth in claim 1, wherein said booster further comprises valve means disposed within said first chamber and being operatively connected to said manually operable means.

3. An anti-skid brake control system as set forth in claim 2, wherein said piston means is operatively connected to said master cylinder.

4. An anti-skid brake control system as set forth in claim 2, wherein said valve means is capable of being moved in unison with said piston means for actuating said master cylinder in the instance of pressure leakage within said hydraulic pressure source.

5. An anti-skid brake control system as set forth in claim 1, wherein:
   said second electro-magnetic valve means is hydraulically connected to said reservoir; and
   orifice means is interposed between said reservoir and said second electro-magnetic valve means,
   whereby upon reception of said second signal from said computer means, pressurized fluid within said booster is permitted to flow to said reservoir through said orifice means so as to gradually increase said reduced pressure within said booster.

* * * * *